United States Patent [19]
Salter et al.

[11] Patent Number: 4,869,622
[45] Date of Patent: Sep. 26, 1989

[54] FEED HOPPER DESIGN

[75] Inventors: James A. Salter, Katy; James J. McCusker; Charles M. Arbore, both of Houston, all of Tex.; Hendricus A. Dirkse, Amsterdam; Rudi Everts, The Hague, both of Netherlands; Günter Eckstein, Hamburg, Fed. Rep. of Germany; Andrew M. Scott; Teunis Terlouw, both of Amsterdam, Netherlands

[73] Assignee: Shell Oil Company, Houston, Tex.

[21] Appl. No.: 98,152

[22] Filed: Sep. 18, 1987

[51] Int. Cl.$^4$ .............................................. B65G 69/06
[52] U.S. Cl. .................................... 406/119; 222/195; 406/118
[58] Field of Search ................... 222/195; 406/12, 14, 406/16, 19, 85, 89, 90, 91, 108, 118, 119, 122, 123, 136, 137, 138

[56] References Cited

U.S. PATENT DOCUMENTS

| | | | |
|---|---|---|---|
| 3,230,016 | 1/1966 | Gilbert et al. | 406/137 |
| 3,391,832 | 7/1968 | Weislehner | 222/195 |

FOREIGN PATENT DOCUMENTS

| | | | |
|---|---|---|---|
| 14769 | 9/1980 | European Pat. Off. . | |
| 43947 | 8/1963 | Luxembourg . | |
| 854866 | 11/1960 | United Kingdom | 406/90 |
| 2103387 | 2/1983 | United Kingdom . | |
| 2145052 | 3/1985 | United Kingdom | 406/119 |

Primary Examiner—Sherman D. Basinger
Assistant Examiner—Thomas J. Brahan

[57] ABSTRACT

The present invention is directed to an apparatus and method for equalizing the flow rate of a combustible, particulate solids, such as coal, and gas mixture discharged from a feed vessel apparatus in a uniform manner to a pressurized receiving reactor, such as a gasifier.

12 Claims, 2 Drawing Sheets

FEED HOPPER DESIGN

RELATED APPLICATIONS

This invention is related to Assignee's copending patent application Ser. Nos. 098,588, 098,589, 098,590, 098,161 and 098,160 filed on Sept. 18, 1987.

BACKGROUND OF THE INVENTION

Various devices have been built for discharging substances which tend to flow easily by gravity, such as grain. While devices such as those disclosed in U.S. Pat. Nos. 3,289,396 and 3,367,724 are concerned with providing "efficient discharge" of particulate material from a bulk storage tank and avoiding bridging and incomplete discharging from such tanks, these devices do not equalize the flow rate of a particulate solids and gas mixture discharged in a uniform manner from a feed vessel apparatus having multiple outlets to a pressurized receiving reactor as does the present invention.

The present invention is directed to overcoming this problem in the art.

Applicants are not aware of any prior art which, in their judgment as one skilled in this particular art, would anticipate or render obvious the present invention. However, for the purpose of fully developing the background of the invention, and establishing the state of requisite art, the following art is set forth: French Patent No. 1,519,210; U.S. Pat. Nos. 4,416,568; 4,223,044; 3,408,116; 3,306,671; 3,289,396; 3,367,724; and Jenike & Johanson newsletter dated January, 1983, Volume III, No. 1.

SUMMARY OF THE INVENTION

The primary purpose of the present invention relates to equalizing the flow rate of a particulate solids and gas mixture discharged in a uniform manner from a feed vessel to a receiving reactor. In particular, this invention relates to equalizing the flow rate of a pulverized coal and gas mixture discharged in a uniform manner from a feed vessel, preferably having multiple outlets, to a pressurized coal gasification reactor, hereinafter referred to as a gasifier, for the manufacture of synthesis gas.

Preferably, such a feed vessel apparatus includes a pressurized vessel having openings at the lower end thereof for discharging the solids and gas mixture, at least two geometrically similar containers having downwardly-converging walls, each of the containers having an inlet orifice at the upper end thereof for receiving the mixture and an outlet orifice at the lower end thereof for discharging the mixture therefrom, and the containers being positioned adjacent each other and intersecting to form an imaginary common plane therebetween at the point of intersection, the lower end of the intersection being at a selected distance perpendicular to an imaginary horizontal plane common to the opening of the containers.

Preferably, a method for uniformly discharging the mixture to such a pressurized receiving reactor includes introducing the mixture into a pressurized vessel having at least two geometrically similar containers mounted substantially within the vessel, each of the containers having an outlet orifice for discharging the mixture therefrom, maintaining a selected superficial velocity of a gas within the pressurized vessel having a selected diameter, controlling the flow rate of the mixture through the outlet orifice of each of the containers by controlling the flow rate of the gas injected through the walls of the containers at the lower portion thereof, discharging the mixture through the outlet orifices of the containers to the receiving reactor, and maintaining the pressure of the pressure vessel higher than the pressure of the receiving reactor.

The various features of novelty which characterize the invention are pointed out with particularity in the claims forming a part of this disclosure. For a better understanding of this invention, its operating advantages and specific object obtained by its uses, reference may be made to the accompanying drawings and descriptive matter in which there are illustrated preferred embodiments of the invention.

DESCRIPTION OF A PREFERRED EMBODIMENT

Figure 1:
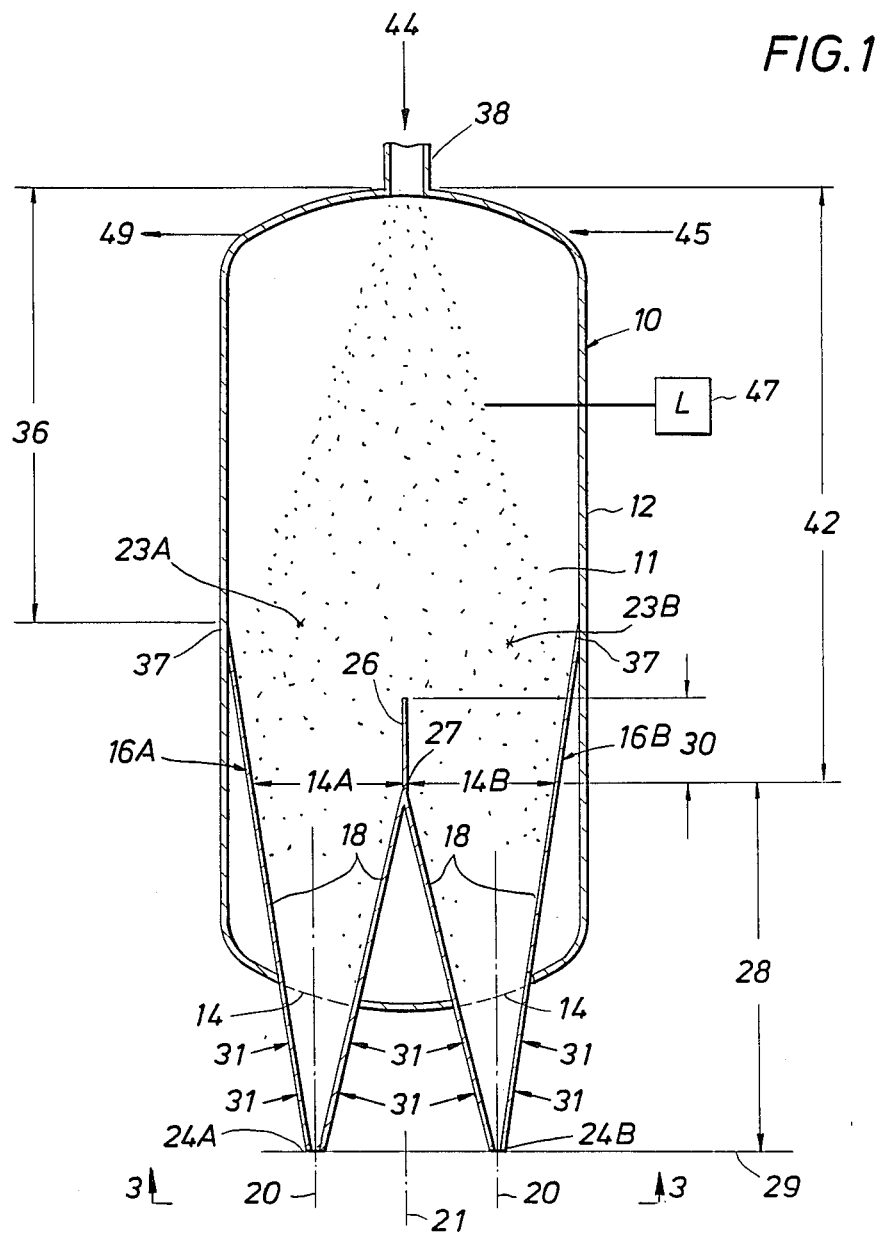
FIG. 1 illustrates a preferred embodiment of the present invention.

Generation of synthesis gas occurs by partially combusting hydrocarbon fuel, such as coal, at relatively high temperatures in the range of 800° to 2000° C. and at a pressure range of from 1 to 200 bar in the presence of oxygen or oxygen-containing gases such as air or a mixture of air and oxygen, in a gasifier. In the preferred embodiment of the present invention, the fuel and gas mixture is discharged from a feed vessel apparatus, preferably having multiple outlets, each outlet being in communication with at least one burner associated with the gasifier. Typically, a gasifier will have burners in diametrically opposing positions. Generally, the burners have their discharge ends positioned to introduce the agents of combustion into the resulting gasifier flame.

Of particular importance in the manufacture of synthesis gas is the uniform manner in which the particulate fuel is introduced to the burners within the gasifier so as to minimize fluctuations in the mass flow rate of the fuel being supplied to the burners. If the mass flow rate of the particulate fuel fluctuates, zones of underheating are generated next to zones of overheating in the gasifier. As a result, in the zones of underheating the fuel is not completely gasified and in zones of overheating the fuel is completely converted into less valuable products, viz. carbon dioxide and water vapor. Additionally, local high temperatures in the gasifier could damage the refractory lining which is normally arranged at the inner surface of the gasifier wall and to the burners of the gasifier.

The optimum case of one fuel feed vessel apparatus per burner is capital intensive. Therefore, it becomes necessary to reduce the number of feed vessels by providing a feed vessel having at least two outlets such that the apparatus and method for operating the apparatus equalizes the flow rate of the solids uniformly discharged from the feed vessel to the gasifier.

An advantage of the present invention is that of uniformly discharging a particulate solids and gas mixture to a gasifier and thereby, preventing zones of underheating and overheating within the reactor.

A further advantage of the present invention is the protection of the refractory lining within the gasifier and burners and other equipment within the gasifier due to preventing zones of underheating and overheating.

An additional advantage of the present invention is more efficient utilization of fuel in the production of synthesis gas.

Although the invention is described hereinafter primarily with reference to pulverized coal, the method and apparatus according to the invention are also suitable for other finely divided solids which are fluidizable but do not flow easily by gravity, i.e. tend to form obstructions to flow, such as a bridge above the discharge outlet as exhibited by flour and cement. Likewise, the present invention is also suitable for other finely divided solid fuels which could be partially combusted, such as lignite, anthracite, bituminous, brown coal, soot, petroleum coke, and the like. The size of the solid carbonaceous fuel is such that 90% by weight of the fuel has a particle size smaller than No. 6 mesh (A.S.T.M.). Preferably, the size of solid carbonaceous fuel is such that 90% by weight of the fuel has a particle size smaller than 100 mesh (A.S.T.M.).

Referring to FIG. 1 of the drawing, a feed vessel apparatus 10 for uniformly discharging a particulate solids and gas mixture 11 to a pressurized receiving vessel or reactor (not shown) generally comprises a pressurized feed vessel 12 having opening means 14 at the lower end thereof for discharging the solids and gas mixture 11; at least two geometrically similar containers 16A, B having downwardly-converging walls 18 and mounted at least partially within or below the pressurized feed vessel 12, each of the containers 16A, B having a longitudinal axis 20 substantially parallel to the longitudinal axis 21 of the pressurized vessel 12; each of the containers 16A, B having an inlet orifice 23A, B at the upper end thereof for receiving the mixture 11 and outlet orifices 24A, B at the lower end thereof for discharging the mixture therefrom; and the containers 16A, B being positioned adjacent to each other and intersecting to form an imaginary common plane 26 therebetween at the points of intersection defined by the curve 27B, 27A, 27C (FIG. 2) the lower end 27A of said intersection being at a selected distance 28 perpendicular to an imaginary horizontal plane 29 common to the opening means 24A, B of the containers 16A, B.

The pressurized vessel 12, preferably having a cylindrical portion, is structured to withstand pressures ranging from about 0 bar absolute to about 200 bar absolute. The opening means 14 at the lower end of the vessel 12 should be of sufficient size to at least allow for discharging of the solids and gas mixture 11.

At least two, and possibly more, geometrically similar containers 16A, B mounted partially (preferably substantially) within or below the pressurized vessel 12 have downwardly-converging walls 18, preferably cone-shaped having an included angle of less than about 90 degrees, preferably 20–40 degrees. Geometric similarity of the containers 16A, B is preferred to minimize any interferences between containers 16A, B with respect to equalizing the flow rate of the solids discharged therefrom.

Mounting the containers 16A, B substantially within the pressurized vessel 12 greatly simplifies the structure of the containers 16A, B which would otherwise have to withstand high differential pressures across the container walls 18. The interior of the walls 18 may be lined with polyethylene or with any other material well knwon to the art for reducing wall friction. By lowering the wall friction, the included angle of the containers 16A, B can be greater.

Preferably, each of the containers 16A, B has a longitudinal axis 20 which is substantially parallel to the longitudinal axis 21 of the pressurized vessel 12 because parallelism contributes to uniform solids movement by gravity so as to achieve an equalized flow rate of solids discharged therefrom. If the containers are substantially not parallel, then eccentric flow channels may form and adversely affect the uniformity of the discharge flow rate.

Each of the containers 16A, B has an inlet orifice 23A, B at the upper end thereof for receiving the mixture 11 and an outlet orifice 24A, B at the lower end thereof for discharging the mixture therefrom.

The containers 16A, B are positioned adjacent to each other and intersect to form an imaginary common plane 26 therebetween at the points of defined by the curve 27B, 27A, 27C, (FIG. 2) intersections. The lower end 27A of said intersection is at a selected distance 28 perpendicular to an imaginary horizontal plane 29 common to the discharge ports 24A, B of the containers 16A, B. In particular, the selected distance 28 is critical to maintaining a uniform and equally- distributed mass flow rate of solids throughout the entire cross-sectional area of the pressure feed vessel 12. The distance 28 is selected to achieve a uniform distribution of flow to the burners of the gasifier and avoid interference between the containers 16A, B. If the distance perpendicular to the plane 29 is greater than the selected distance 28, then a larger diameter feed vessel apparatus would be required to maintain the selected included angle of the containers 16A, B. If the distance perpendicular to the plane 29 is less than the selected distance 28, then interference between containers 16A, B would occur and thus nonequalizing solids and gas flow would be discharged therefrom.

Figure 2:
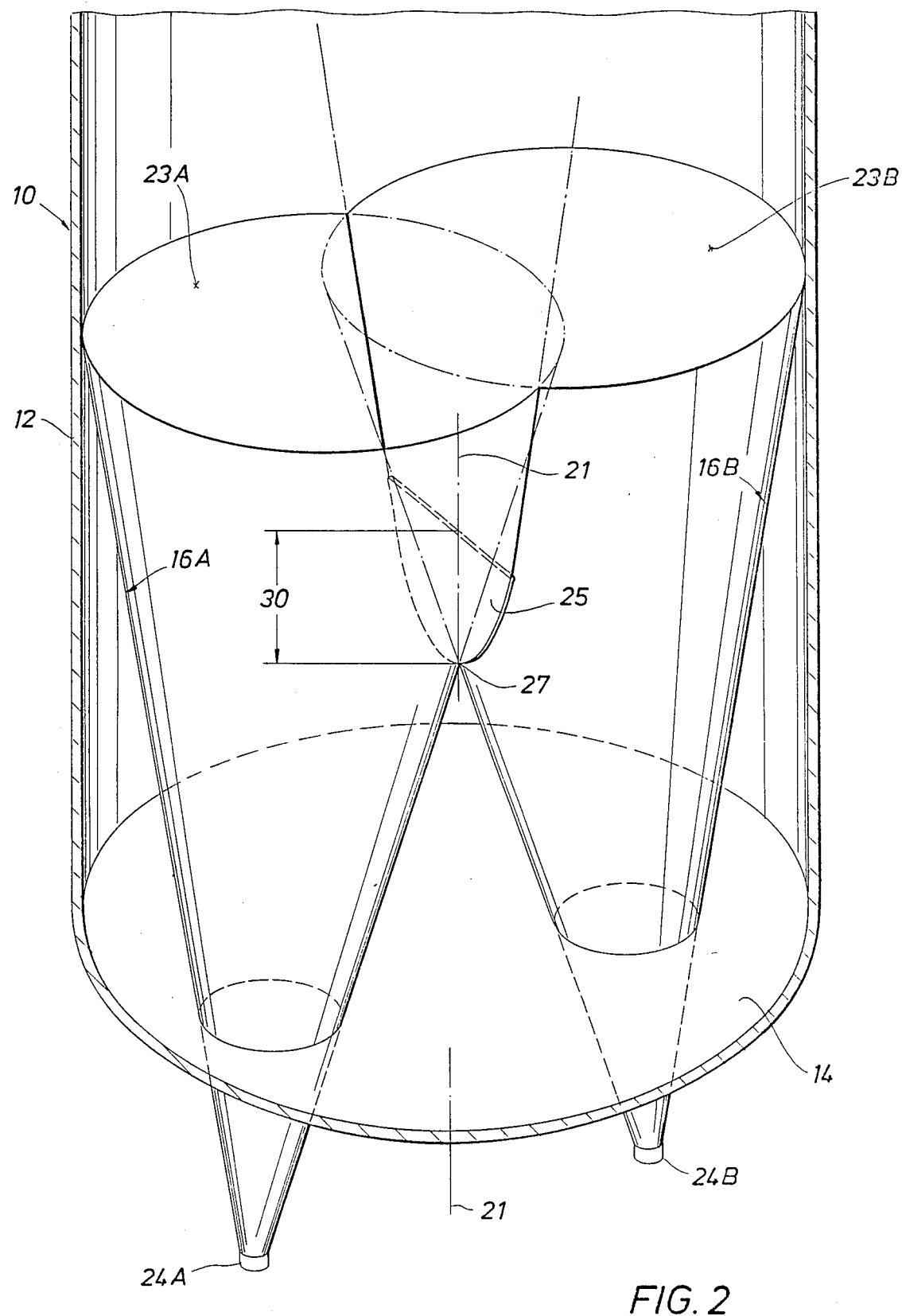
FIG. 2 is an isometric view of the preferred embodiment with the lower portion shown in phantom.

Referring to FIG. 2 a partition 25, preferably structured as both rigid and plate-like, is positioned along the imaginary common plane 26 (FIG. 1) between the containers 16A, B. The partition 25 has a lower end near the lower end of the intersection 27. The partition 25 ensures that the solids will be drawn equally from all areas of their respective portions of the bed of solids within the pressure vessel 12 and manifolding or baffling the flow of solids so as to ensure an equalized and controlled mass flow rate of solids discharged from the containers 16A, B. The preferred height 30+28 of the partition 25 is such that it is about equal to distance 36 from the top of feed vessel 12. The maximum height of the partition 25 above plane 29 should preferably be the distance 36 from the top of vessel 12 minus 1.0 times the maximum bridging dimension. The minimum height of the partition 25 above plane 29 should preferably be the distance 36 plus 0.5 times the maximum bridging dimension.

Removability of the partition 25 allows substitution of partitions having different geometries and heights 30 to accommodate various operating conditions such as different coal types having characteristic solids properties.

The diameter of the outlet orifices 24A, B of each container 16A, B in the present invention is smaller than the maximum bridging dimension of the solids. The maximum bridging dimension is generally defined as the greatest distance the particle bed can span thus forming a stable obstruction to flow. The dimension is a function of granular solids flow properties, the geometry and material of contruction of the feed vessel, etc. Since the diameter of the outlet orifices 24A, B is smaller than the maximum bridging dimension, then a stable obstruction to flow will occur in the absence of flow promotion or aeration.

In the present invention, for example, if the maximum bridging dimension of the solids was about 18-24 inches, then the diameter of the outlet orifices 24A, B would have to be greater than 24 inches in the absence of flow promotion or initiation.

However, by injecting a first gas 31 into the lower portions of the containers 16A, B and aerating the solids therein the diameters of the outlet orifices 24A, B of each container 16A, B can be decreased to approximately less than one half inch.

Figure 3:
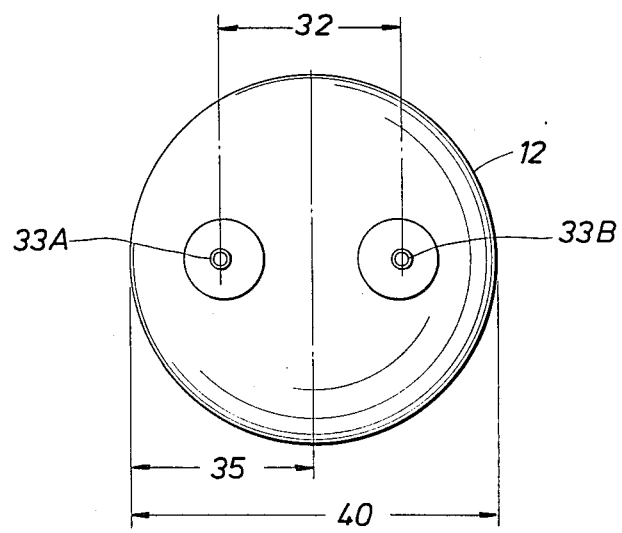
FIG. 3 is a plan view of FIG. 1 taken along line 3—3.

Referring to FIG. 3, the distance 32 between the centers 33A, B of the outlet orifices 24A, B of the containers 16A, B at the opening means 14 of the pressurized feed vessel 12 are substantially equal to the radius 35 of the pressurized feed vessel 12. The basis for the relationship of the distance 32 to the radius 35 is a consequence of the previously selected included angle of containers 16A, B and the distance 28.

The distance 36 (FIG. 1) between the top 37 of the containers 16A, B and the top 38 of the pressurized vessel 12 is at least substantially equal to 1.5 times the diameter 40 (FIG. 3) of the pressurized vessel 12. The basis for the relationship of the distance 36 to the diameter 40 is a consequence of the selected included angle of the containers 16A, B, the distance 28, and the height 30 of the web 25 (FIG. 1). If the distance 36 is substantially less than 1.5 times the diameter 40, then when the volume of solids and gas mixture within the feed vessel falls below about 50% by volume of the feed vessel, communication of solids flow effects between containers 16A, B will result. Also, introducing new solids into the feed vessel will result in unsteady flow from outlet orifices 24A, B.

Preferably, the distance 42 (FIG. 1) between the lower end 27A of the intersection of the containers 16A, B and the top 38 of the pressurized feed vessel 12 is at least equal to 1.5 times the diameter 40 (FIG. 3) of the pressurized feed vessel 12. The basis for the relationship of the distance 42 to the diameter 40 is a consequence of the selected diameter 40 of the feed vessel apparatus and the selected included angle of containers 16A, B.

In operation of the above-described apparatus the method generally comprises introducing the mixture 11 into a pressurized vessel 12, preferably at or near inlet 44 at the upper end of the vessel 12.

The flow rate of a second gas 45, such as nitrogen, is injected into the pressurized vessel 12 at a selected rate not to exceed the terminal falling velocity of the solids within the containers 16A, B. The terminal falling velocity is defined as a particle in free fall in a still gas such that the particle is acted upon only by friction and gravitational forces which accelerate the particle from rest until a terminal steady state velocity is reached.

The flow rate of the second gas 45 is controlled at a rate not to exceed the terminal falling velocity of the solids because excessive elutriation of very fine particles may occur thereby affecting the flow properties of solids by removing a considerable fraction of the fine particles present in the solids and not having obtained an equalized flow rate of discharged solids.

A selected upward or downward superficial velocity of the interstitial gas, such as nitrogen, within the pressurized feed vessel 12 having a selected diameter is achieved by controlling the injection rate of gases 31 and 45. Superficial velocity is defined as the average velocity of a gas for a specified cross-section neglecting the presence of the particulate solids. Maintaining an upward superficial velocity of the first gas 31 permits a reduction in the density of the bed thus equalizing the flow rate through the discharge ports. Maintaining a downward superficial velocity permits transport of a higher solids/gas mixture.

One way of obtaining a selected upward or downward superficial velocity of the first gas 31 is to control the flow rate of gas in the mixture 11 within the pressurized vessel 12 such as by venting gas in the mixture 11 from the pressurized vessel 12, preferably in the upper portion 49 thereof. Alternatively, the selected upward superficial velocity of the first gas 31 can be obtained by controlling the rate of injecting gas from source 31. Similarly, the selected downward superficial velocity of the second gas 45 can be obtained by controlling the rate of injecting gas from source 45.

Constructing the vessel 12 in the manner previously described which minimizes the interference between compartments 16A, B permits benefits to be derived from the injection of a second gas 31.

The injection of a gas 31 typically into the lower one quarter of the compartments 16A, B can bring about several effects relating to the equalized uniform discharge flow of particulate solids from the described vessel. The injection of a gas 31 can produce many beneficial results, three of which are to break bridges, increase discharge rate over the nonaerated case and induce uniform flow from a discharge opening smaller than the previously defined minimum opening dimension for nonaerated discharge flow. Since the vessel 12 has been constructed to minimize interference between compartments 16A, B independent control over flow rate, for example, is possible.

The optimal gas flow 31 for maximum solids discharge rate with minimal variation in rate can be associated with the slip velocity between the gas 31 and the flowing particle stream. Slip velocity in this case is taken as the relative difference in velocity between the injected gas 31 and the components of the flowing gas/particle stream which exits via orifices 24A, B. The velocities of the gas and gas particle streams may be determined at a reference cross section coincident with the effective gas 31 injection point(s).

The downward flowing component of the gas 31, cocurrent with the gas/particle stream produces the desired effects of permitting a measure of control over discharge rate, increasing rate over the nonaerated case and smoothing out variations in solids flow rate.

In the event the gas 31 injection rate is high then an upward flow of gas counter to the downward flow of solids/gas would be produced. This upward gas flow would produce relatively high slip velocities, reduce the density of the flowing particle/gas stream, create a contribution to the vent gas stream 49, and effectively reduce the discharge rate. In effect the downward moving particles would be held up by the counter current flow of gas 31. In the event the upward flow of gas is very high then gas bubbles would be expected to form. The presence of relatively large gas bubbles in the flowing stream would produce irregularities in the solids discharge rate.

In the event the gas 31 injection velocity is very low then only a downward cocurrent flow of gas 31 and gas/solids would occur. The velocity of the resultant gas/solids stream would be low and result in a lower solids discharge rate. Continuing to lower the gas 31 injection rate will eventually result in a non-flowing condition at the discharge orifice.

During operation when there is little or no countercurrent gas flow it would be necessary to introduce make-up gas 45 into the vapor cap. Depending on the discharge rate of solids and gas the flow rate of vent stream 49 may actually be zero if the make-up rate exactly matches the solids discharge rate.

Preferably, a volume of solids and gas mixture 11 within the feed vessel 12 of 50% of the volume of said feed vessel should be maintained in the feed vessel 10 to minimize the effect of level and discharging the flow out of the feed vessel apparatus. Should the volume be substantially less than the specified amount, then fluctuations in the mass flow rate of solids introduced to the burners would occur and the above-mentioned problems of overheating and underheating would be observed. A level-sensing device 47 for monitoring the volume of the mixture 11 within the containers 16A, B may take the form of gamma-ray absorption or in any other manner well known to the art which would not provide an obstruction to flow.

The method further comprises controlling the flow rate of the mixture 11 discharged through the outlet orifices 24A, B of each of the containers 16A, B to the receiving reactor (not shown) by controlling the flow rate of the first gas 31, such as nitrogen, syngas, or other carrier gas, through the walls 18 of the containers 16A, B at the lower portion thereof. The mixture 11 may be discharged from outlet orifices 24A, B of both containers 16A, B simultaneously, from less than all of the containers 16A, B, and/or at different rates from the containers 16A, B by controlling the flow rate of the first gas 31 as described above.

The pressure of the pressure vessel 12 is maintained higher than the pressure of the receiving reactor (not shown) to convey the solids to the receiving reactor.

The foregoing description of the invention is merely intended to be explanatory thereof, and various changes in the details of the described apparatus and method may be made within the scope of the appended claims without departing from the spirit of the invention.

What is claimed is:

1. A feed vessel apparatus for equalizing the flow rate of a particulate solids and gas mixture discharged in a uniform manner to a pressurized receiving reactor, said apparatus comprising:
    a pressurized vessel having opening means at the lower end thereof for discharging said solids and gas mixture;
    at least two geometrically similar containers having downwardly converging walls and mounted at least partially within said pressurized vessel, each of said containers having a longitudinal axis coaxial with said opening means and substantially parallel to the longitudinal axis of said pressurized vessel;
    each of said containers having an inlet orifice at the upper end thereof for receiving said mixture and an outlet orifice at the lower end thereof for discharging said mixture therefrom; and
    said containers being positioned adjacent each other and intersecting to form an imaginary common plane therebetween at the point of intersection, the lower end of said intersection being at a selected distance perpendicular to an imaginary horizontal plane common to the outlet orifices of said containers.

2. The apparatus of claim 1 wherein said containers are cone-shaped having an included angle less than about 90 degrees.

3. The apparatus of claim 1 wherein a rigid plate-like partition is positioned along the imaginary common plane between said containers, said partition having a lower end near the lower end of said intersection.

4. The apparatus of claim 3 wherein said partition is interchangeable.

5. The apparatus of claim 3 wherein the minimum height of said partition above said outlet orifices is 1.5 times the diameter of said pressurized vessel plus 0.5 times the maximum bridging dimension of the solids within said vessel.

6. The apparatus of claim 3 wherein the maximum height of said partition above said outlet orifice is 1.5 times the diameter of said pressure vessel at the point where said containers are mounted within said pressurized vessel minus 1.0 times the maximum bridging dimension of the solids within said vessel.

7. The apparatus of claim 1 wherein at least the lower portions of said containers are aerated.

8. The apparatus of claim 7 wherein the diameter of said outlet orifice of each container is less than about one inch for the solids and gas mixture having a density of about 200–500 kg/m$^3$.

9. The apparatus of claim 1 wherein the distance between the centers of said outlet orifices of said containers at the opening means of said pressurized vessel are substantially equal to the radius of said pressurized vessel.

10. The apparatus of claim 1 wherein the distance between the top of said containers and the top of said pressurized vessel is at least substantially equal to 1.5 times the diameter of said pressurized vessel.

11. The apparatus of claim 1 wherein the distance between the lower end of the intersection of said containers and the top of said pressurized vessel is at least substantially equal to 1.5 times the diameter of said pressurized vessel.

12. A feed vessel apparatus for equalizing the flow rate of a solids and gas mixture discharged in a uniform manner to a receiving reactor, said apparatus comprising:
    a pressurized vessel having opening means at the lower end thereof for discharging said solids and gas mixture;
    at least two geometrically similar containers having downwardly converging walls;
    each of said containers having an inlet orifice at the upper end thereof for receiving said mixture and an outlet orifice at the lower end thereof for discharging said mixture therefrom; and
    said containers being positioned adjacent each other and intersecting to form an imaginary common plane therebetween at the point of intersection, the lower end of said intersection being at a selected distance perpendicular to an imaginary horizontal plane common to the outlet orifices of said containers.

* * * * *